US009256996B2

(12) United States Patent
Morley

(10) Patent No.: US 9,256,996 B2
(45) Date of Patent: Feb. 9, 2016

(54) METHOD AND SYSTEM FOR TRAINING USERS RELATED TO A PHYSICAL ACCESS CONTROL SYSTEM

(75) Inventor: Michael Morley, Deerfield, NH (US)

(73) Assignee: SCHNEIDER ELECTRIC BUILDINGS, LLC, Palatine, IL (US)

( * ) Notice: Subject to any disclaimer, the term of this patent is extended or adjusted under 35 U.S.C. 154(b) by 523 days.

(21) Appl. No.: 13/270,590

(22) Filed: Oct. 11, 2011

(65) Prior Publication Data

US 2013/0088324 A1 Apr. 11, 2013

(51) Int. Cl.

| | |
|---|---|
| ***G05B 19/00*** | (2006.01) |
| ***H04Q 9/00*** | (2006.01) |
| ***B60R 25/00*** | (2013.01) |
| ***E01B 19/00*** | (2006.01) |
| ***G06F 17/00*** | (2006.01) |
| ***G07C 9/00*** | (2006.01) |

(52) U.S. Cl.
CPC ........ *G07C 9/00103* (2013.01); *G07C 9/00111* (2013.01)

(58) Field of Classification Search
CPC .................................. G08B 13/00; H04L 9/14
USPC .......................................................... 340/541
See application file for complete search history.

(56) References Cited

U.S. PATENT DOCUMENTS

| | | | | |
|---|---|---|---|---|
| 2003/0107470 | A1* | 6/2003 | Kady | 340/5.21 |
| 2003/0149675 | A1* | 8/2003 | Ansari et al. | 706/2 |
| 2005/0075116 | A1 | 4/2005 | Laird | |
| 2005/0278630 | A1* | 12/2005 | Bracey | 715/704 |
| 2006/0086894 | A1 | 4/2006 | Shepherd | |
| 2007/0268145 | A1 | 11/2007 | Bazakos et al. | |
| 2008/0136649 | A1 | 6/2008 | Van De Hey | |
| 2009/0207020 | A1* | 8/2009 | Garnier et al. | 340/541 |
| 2010/0007489 | A1 | 1/2010 | Misra | |
| 2010/0026802 | A1 | 2/2010 | Titus et al. | |
| 2010/0090901 | A1 | 4/2010 | Smith | |
| 2011/0148633 | A1* | 6/2011 | Kohlenberg et al. | 340/541 |
| 2012/0025947 | A1* | 2/2012 | Sinha | 340/5.6 |

* cited by examiner

*Primary Examiner* — Jennifer Mehmood
*Assistant Examiner* — Pameshanand Mahase
(74) *Attorney, Agent, or Firm* — Lando & Anastasi LLP

(57) ABSTRACT

A system and method for training users of an access control system. In particular, the system and method allow for the imposition of "penalties" for improper behavior so as to balance the training of the user with the burden placed on the operators of the system reacting to violations, while allowing the users to accomplish their tasks. The system can also track the location of users or items, determine if a request to pass through a control point is proper based on various factors, and if appropriate, administer a "penalty" based on several contributing factors.

30 Claims, 4 Drawing Sheets

METHOD AND SYSTEM FOR TRAINING USERS RELATED TO A PHYSICAL ACCESS CONTROL SYSTEM

FIELD OF THE INVENTION

The present invention relates to physical security and access control and more particularly to a method and system for training users related to changes in levels of security.

BACKGROUND OF THE INVENTION

It is common to limit access to physical locations through access control systems. The access control system can vary in complexity from a latch a child cannot reach to biometrics such as a fingerprint or retina reader. Some of the more common systems include proximity cards and other credentials, where the card or other credential is linked to a particular individual.

In a high security environment, a number of strategies may be employed to ensure that a physical access control system maintains an accurate record of users' current location. The system can thereby determine if an access attempt inconsistent with the purported location of the user is being made and then take appropriate action. One method that an authorized user may use to "assist" a fellow worker which would be inconsistent with the intended security is to go through a gate or turnstile using their proximity card and then pass the card back ("pass back") to someone else to use. Another method is for a user to hold open a door to allow a fellow worker to gain access without using their card ("tailgating").

As described in the "Detailed Description of the Invention" section, the system can have methods to deter users from participating in pass back or tailgating activities, such as notification or preventing access.

SUMMARY OF THE INVENTION

It has been recognized that levels of security might change and it may take time for participants to learn the requirements of the new level of security. As persons are learning the process, particularly related to increased security levels, the deterrents to limit improper access control activity can place an excess burden on the system operators. As will be clearly discussed in the "Detailed Description of the Invention" section, the attempt to improperly use the access control system could result in a person being locked out and requesting an operator to override the system. The system and method will allow for training of users regarding the new requirements while not placing an undue burden on the operator.

One aspect of the present invention is a security system for allowing access to secure areas, the system has at least one access control device configured to control the flow of items or users in an at least one secure area; an access control database containing information regarding criteria for allowing access to the at least one secure area; a control system configured to receive information from the at least one access control device and to compare the information to the access control database to determine if access is to be granted; where the control system is configured to modify access if a discrepancy is noted; and the system also has a training model that is configured to modify the modified access based on operator-based rules.

In one embodiment, the security system for allowing access to secure areas further comprises a location database configured to track the location of users in the at least one secure area.

In one embodiment, the security system for allowing access to secure areas has a training model that is capable of being customized by the operator.

In one embodiment, the security system for allowing access to secure areas enables customization that is based on the time since the security system was implemented. In one embodiment, the security system for allowing access to secure areas enables customization that is based on the user's start date. In one embodiment, the security system for allowing access to secure areas enables customization that is based on a change in the security level. In one embodiment, the security system for allowing access to secure areas enables customization that is based on the number of previous violations by the user.

In one embodiment, the security system for allowing access to secure areas enables customization that includes penalties for deviating from standards related to access to the at least one secure area.

In one embodiment, the security system for allowing access to secure areas has a penalty that consists of no access to the at least one secure area. In one embodiment, the security system for allowing access to secure areas has a penalty that includes a notification to the operator and the user identifying a violation of the standards related to access to the at least one secure area. In one embodiment, the security system for allowing access to secure areas has a penalty that consists of delayed access to the at least one secure area.

In one embodiment, the security system for allowing access to secure areas has a delay that is based, in part, on the number of days since a change in the security level. In one embodiment, the security system for allowing access to secure areas has a delay that is based, in part, on whether the user is categorized as a new user.

Another aspect of the present invention is a security system for allowing access to secure areas, the system has at least one access control device configured to control the flow of items or users in at least one secured area; an access control database containing information regarding criteria for allowing access to the at least one secure area; a control system configured to receive information from the at least one access control device and to compare the information to the access control database to determine if access is to be granted; a location database that is configured to track the location of users in the at least one secure area; where the control system is configured to modify access if the user's location is inconsistent with information in the location database; and a training model that is configured to modify the modified access based on operator-based rules.

In one embodiment, the security system for allowing access to secure areas has a training model that is capable of being customized by the operator and the customization includes penalties for deviating from the standards related to access to the at least one secure area.

In one embodiment, the security system for allowing access to secure areas enables customization that is based on the time since the security system was implemented. In one embodiment, the security system for allowing access to secure areas enables customization that is based on the user's start date. In one embodiment, the security system for allowing access to secure areas enables customization that is based on a change in the security level.

In one embodiment, the security system for allowing access to secure areas has a penalty that is delayed access to the at least one secured area. In one embodiment, the security system for allowing access to secure areas has a delay that is based, in part, on the number of days since a change in the security level. In one embodiment, the security system for allowing access to secure areas has a delay that is based, in part, on whether the user is categorized as a new user.

Another aspect of the present invention is a method of training for an access control system where the method includes providing at least one access control device for controlling the flow of items or users in at least one secure area; detecting a request to access the at least one secure area; determining if the user's location is known prior to their access request; providing a training mode that includes customizable penalties for an access request that has an inconsistency as compared to an access control database containing information regarding criteria for allowing access to the at least one secure area; and determining the penalty for inconsistency.

In one embodiment, the method of training for an access control system has a penalty for deviating from the standards related to access to the at least one secure area. In one embodiment, the method of training for an access control system has a penalty that is no access to the at least one secure area. In one embodiment, the method of training for an access control system has a penalty that includes notification to the operator and user identifying a violation of the standards related to access to the at least one secure area. In one embodiment, the method of training for an access control system has a penalty that consists of delayed access to the at least one secure area.

In one embodiment, the method of training for an access control system enables customization that can be performed by the operator. In one embodiment, the method of training for an access control system enables customization that is based, in part, on the time since the security system was implemented. In one embodiment, the method of training for an access control system enables customization that is based, in part, on the user's start date. In one embodiment, the method of training for an access control system enables customization that is based, in part, on a change in the security level.

These aspects of the invention are not meant to be exclusive and other features, aspects, and advantages of the present invention will be readily apparent to those of ordinary skill in the art when read in conjunction with the following description, appended claims, and accompanying drawings.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

PREFERRED EMBODIMENTS OF THE INVENTION

A system and method for allowing the training of users of a security system that controls physical access. In particular, the system and method allow for the use of "penalties" for improper behavior so as to balance the training of the user with the burden placed on the operators of the system reacting to infractions, and allowing the users to accomplish their task. The system in an embodiment tracks the location of users, determines if a request to pass through a control point is proper based on various factors, and if appropriate administers a "penalty" based on several factors.

The action (or reaction) of the system in the conventional or current system could depend on the level of security. The action by a conventional system may involve denying access to an area completely, denying access for a given time following initial access to an area, or simply logging a violation but granting access. In the first instance the user is locked down indefinitely and requires external intervention or further anti-pass back (APB)/anti-tailgating (ATG) violations (i.e. the user tailgates someone else to overcome the current situation) to redress the mismatch between the perceived system location and the physical location. In the second instance, a countdown timer is used from the time of the last access to determine when the system is reset or negates the user's location, thereby effectively removing the APB/ATG rules from an area once the time has expired. In the final instance, access is granted even though it is a breach of APB/ATG rules, instead relying on the system to log violations. None of these instances provide effective focused behavior encouragement to train users in APB/ATG. The current system is described below.

Figure 1:
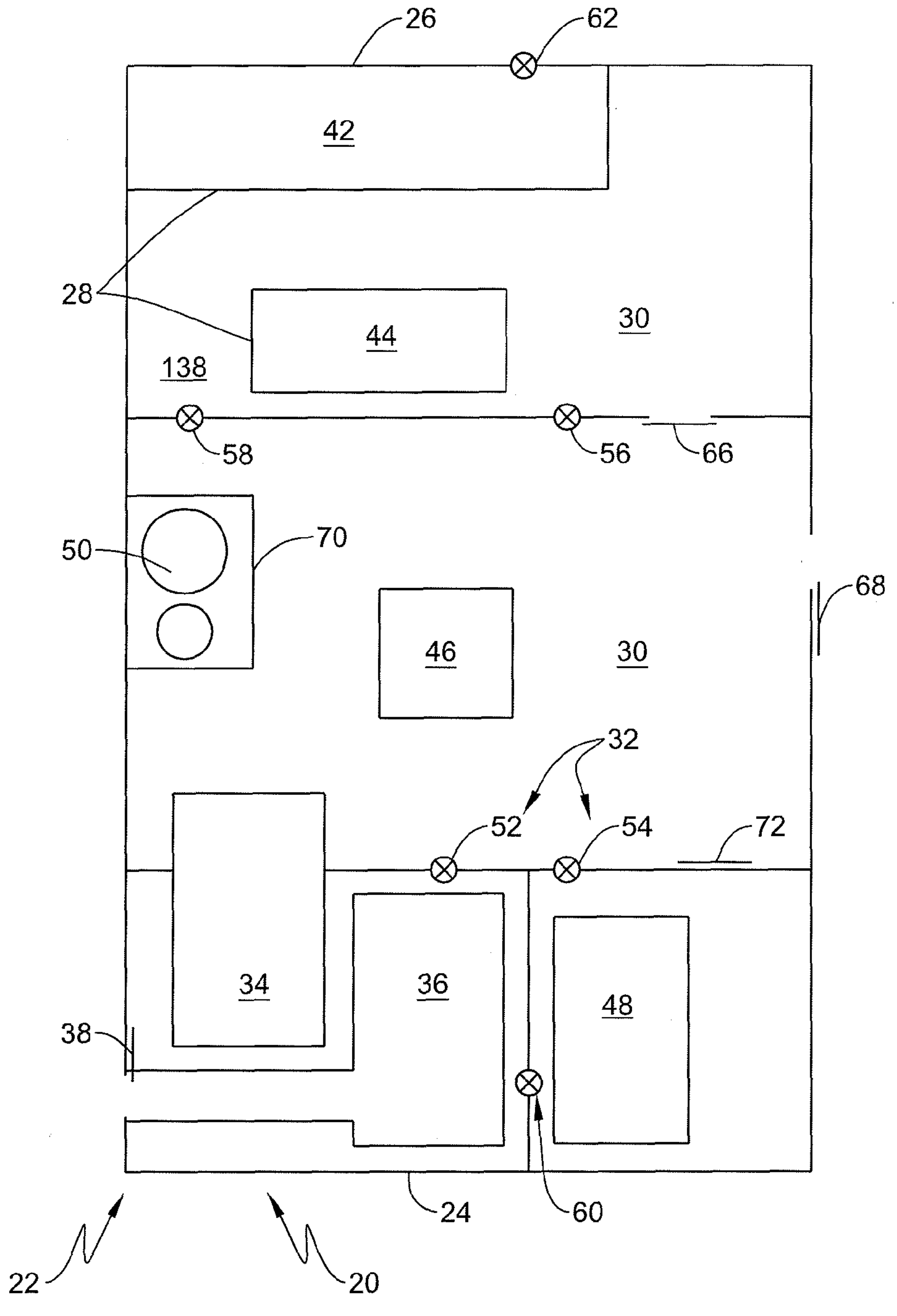
FIG. 1 shows a pictorial display of an industrial complex security system.

Referring to FIG. 1, a pictorial display of an industrial complex 22 and its associated security system 20 is shown. The complex 22 has a plurality of fences 24 and walls 26 of buildings 28 to define a plurality of areas 30 in which access is controlled. The access is limited by a plurality of control points 32 such as rotary (turnstile) gates 52, 54, 56, 58, 60, or 62, or mechanical gates. The complex 22 has a plurality of buildings 28 which have access control.

The complex 22 has a main building 34 and a parking lot 36 that is accessible through a gate 38 in the fence 24. The main building 34 could have many stories and various suites and one floor will be discussed with respect to FIG. 2. Still referring to FIG. 1, the plurality of buildings 28 in the complex 22 can include a variety of facility types such as a storage facility 42, a manufacturing building 44, a transportation building 46, and a research facility 48. The complex 22 can have other features such as storage tanks 50.

The complex 22 has a plurality of rotary turnstiles 52, 54, 56, 58, 60, and 62 that limit access from a portion of the complex 22 to another portion of the complex 22. Each of the rotary turnstiles 52, 54, 56, 58, 60, and 62 has an access control device 74 that reads an authentication device (proximity card) 76, as shown in FIG. 3, to determine the identification/authentication of the user as well as gathering location information for where the read occurred in order to determine if a user should be allowed to move into the secured area.

The complex 22 in addition has several gates 38, 66, 68, 70, and 72. Vehicular access, such as though the gate 66 could be handled manually (i.e. security operator-based) or could utilize a temporary vehicular pass. Violations could be handled via email notification or some other method so that overall vehicular traffic in an area is not adversely affected.

Figure 3:
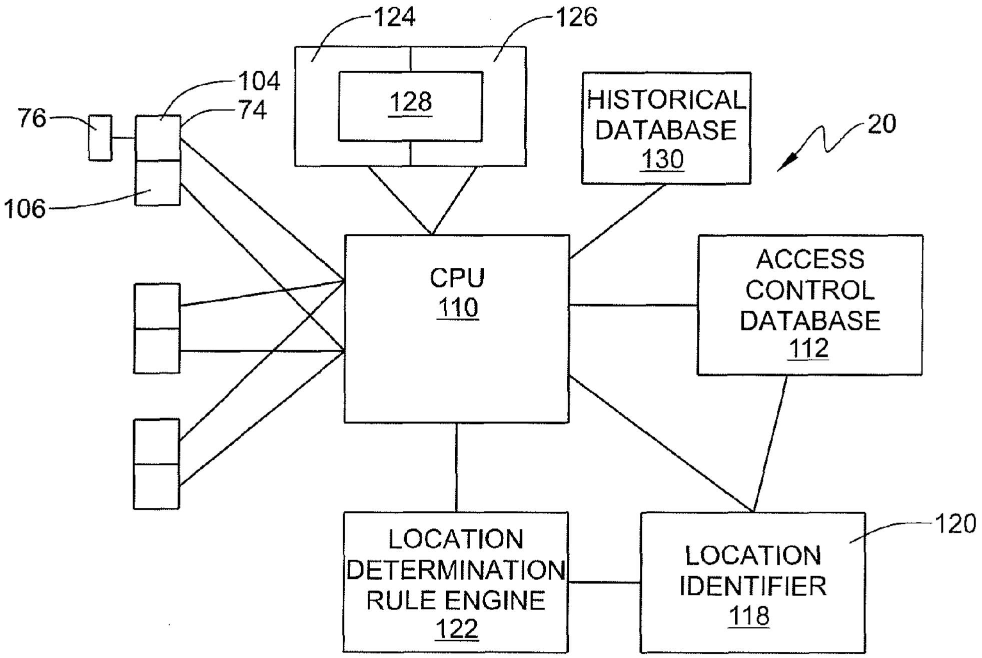
FIG. 3 is a schematic of a system for controlling a building's physical access control system.

As discussed above, one of the concerns with secured systems is that the users may pass back their authentication device, such as a proximity card 76 as seen in FIG. 3, to another person to use. Rotary turnstiles, such as 52, 54, 56, 58, and 60 are a location where pass back can occur. Even though the turnstile limits, due to its size, one user through the turnstile per access transaction, the turnstile may be located in areas where the ability to pass small items, such as the proximity card 76, through openings in the turnstile 56 or the fence 24 is possible.

Figure 2:
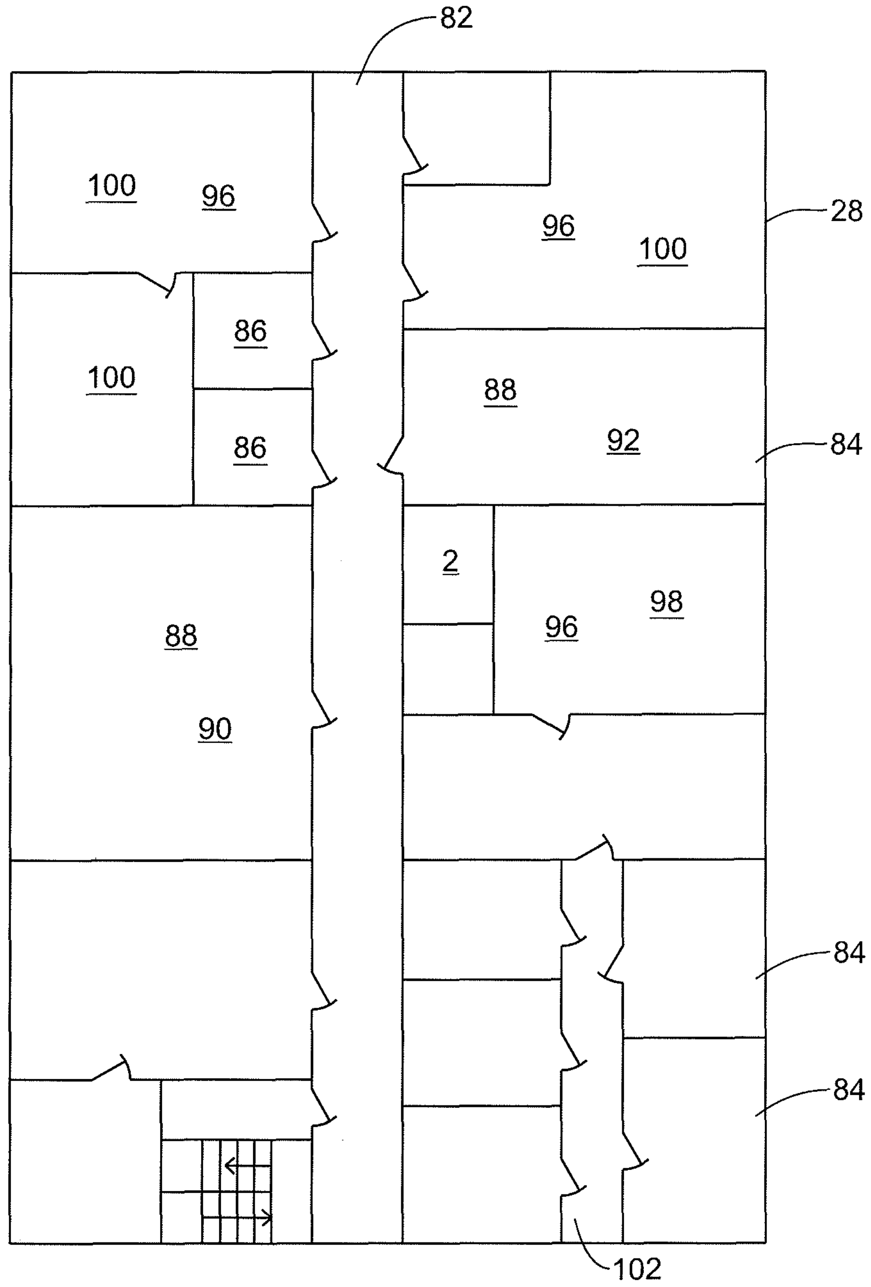
FIG. 2 shows a pictorial display of a building in the industrial complex security system.

Referring to FIG. 2, a pictorial display of a floor 82 in the building 28 in the industrial complex 22 is shown. The building 28 has a plurality of rooms 84 including rooms, such as a pair of rest rooms 86, that might not require an authentication device, such as proximity card 76, for access. A second set of rooms 88, such as an office 90 and 92, might require a proximity card 76 for access but not for egress. A third set of rooms 96, such as computer rooms 98 or labs 100 may require the user to use a proximity card 76 for access to the room and for egress from the room. If the secured system employs video recognition (facial, gesture, or other kinetic attributes) in place of credential for validating the user, then the area-based restrictions such as anti-pass-back and anti-tailgating, and variations thereof, are still valid.

Referring to FIG. 3, a schematic of the security system 20 for controlling the physical access control system for the industrial complex 22 including buildings 28 is shown. The security system 20 has a plurality of access control devices 74 including an input mechanism 104 and an access restrictor or output device 106 for monitoring and granting access to locations. The restrictor or output device 106 can include devices such as a door lock or a braking mechanism on a turnstile, such as 52, 54, 56, 58, 60, or 62 in FIG. 1. In order to gain access to a certain physical location, a user needs to provide authentication to the access control device 74 through the input mechanism 104. The authentication can be in various forms including, but not limited to, a proximity card that is placed in proximity to a proximity card reader, which is part of the input mechanism 104. Another alternative is a keypad or swipe card reader in which the user either enters their code or swipes their card. Other credential alternatives include RFID, reader, and tags.

The authentication device 74, such as a proximity card 76, requires a form of credentials. Credentials limit access by controlling at least one of three items of Have, Know, or About. For example, the user would Have a card; a user would Know a PIN; and biometrics are About a user.

The security system 20 has a controller or central processing unit 110 for controlling the security system 20. The CPU 110 accesses the access control database 112 that contains information related to access privileges and the information received from the input mechanism 104 of the access control device 74 is compared to the information in the access control database to determine if the access restrictor output device 106 should be set to allow access. The access restrictor output device 106 could be an electronic latch, mechanical latch, or a gate.

The security system 20, in addition, has a location identifier 118 which can be part of the access control database 112 or part of another database 120 that maintains where a user is located, the last location verified, and the time of the location verification.

The industrial complex 22 has various access control points 32 such as rotary (turnstile) gates 52, 54, 56, 58, 60, or 62 in FIG. 1, or mechanical gates. While some access control points may generally control access in one direction, other access control points control access in both directions so it can be determined where personnel are located. For example when a person, user A, passes through the turnstile 58 by scanning their access card, and the gate rotates, the user would be known to be in space 138. Therefore, if user A's card is then attempted to be used at a different location, the system could respond accordingly, up to and including blocking access.

For example, referring to FIG. 1, if user A goes through turnstile 58 into space 138 at 1432 (2:32 PM) the system would record that information in the location identifier 118. The security system 20, in addition, has a location determination rules engine unit 122 that takes information related to a user including last location verified, time of verification, and a factor based on the location. For example, if user A is in space 138, the system may include factors including the length of time a person typically stays in a space, as well as the ability to exit the space without verification. For example, it would not be expected that a person would spend a lengthy period of time in a hallway 102 in FIG. 2 prior to moving into one of the rooms adjoining the space. Likewise, referring to FIG. 1, if there is no reason for a person to stay in space 138 and it has been known that individuals use the vehicle gate 66 to exit the space then the system 20, without the location determination rules engine unit 122, would not reflect the user's proper location. In addition to tailgating at a door in the building in FIG. 2, or passing back at a turnstile, an individual's non-compliance with their responsibility for monitoring and recording passage of users and materials can also be addresses.

The security system can incorporate numerous technologies for tracking users known to those skilled in the art, including RFID. The vehicle gate can be an area where the procedures could change as the level of security changes. For example, at a certain level of security the user in a vehicle may be required only to show his or her badge, while at a higher level the badge may be required to be scanned into an input system and the direction of flow through the gate noted.

Still referring to FIG. 3, the security system 20 includes an interface device 124 for receiving operator input and a graphical display system 126 for an operator to control the security system 20. In another embodiment, the interface device 124 is a keyboard and a point of control such as a mouse or tracker ball. In another embodiment, the interface device 124 and the graphical display system 126 are incorporated into one device such as a touchscreen 128.

Figure 4:
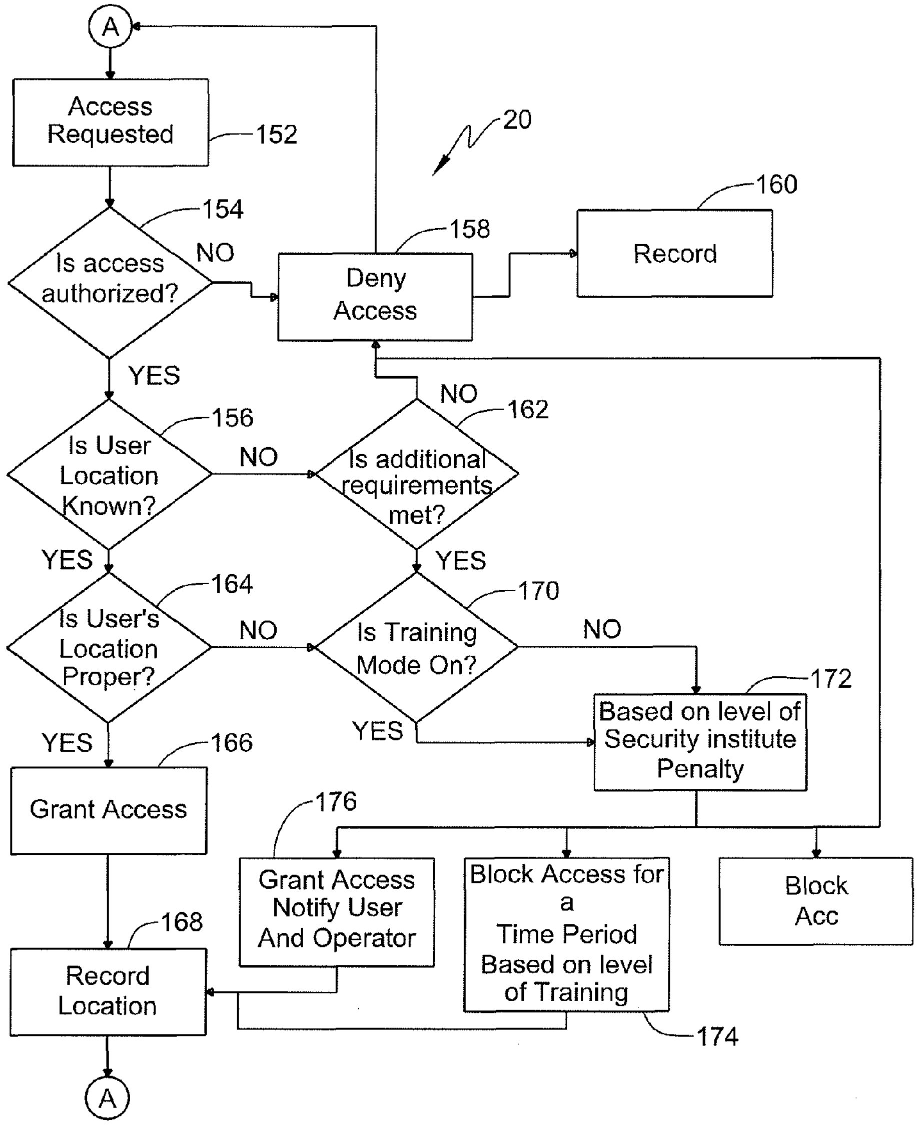
FIG. 4 is a schematic of a method of adjusting privileges including a training model.

FIG. 4 shows a schematic of a method of determining access including a training mode. The security system 20 receives a request to grant access to a specific location from an input mechanism for an access point such as a particular door present in the building 28 as seen in FIG. 2 or a turnstile as seen in FIG. 1 and represented as block 152 as seen in FIG. 4. The security system 20 compares the request to the authorization as stored in the access control database 112 and represented by decision diamond 154 and deter mines if the user is authorized to pass through the access point. If the authorization is proper as represented by the "yes" branch from decision diamond 154, then the security system 20 goes to the next decision as represented by decision diamond 156 related to ascertaining if the person's location is known, as described below. If the authorization is not proper as represented by the "no" branch from the decision diamond 154, then the security system 20 does not grant access to the access restrictor 106 as represented by block 158. In addition, the security system 20 can record the denial in a historical database 130 in FIG. 3 as represented by block 160.

If authorization is proper as represented by the "yes" branch from decision diamond 154, the security system 20 determines if the system has an established location for the user. If the user's location is not known as represented by the "no" branch of the decision diamond 156, an additional decision; based on several factors including the level of security, the point of access, and the user's credential levels, can determine if the user is going to be granted access as represented by decision diamond 162.

If the additional requirements as represented by the "no" branch of the decision diamond 162 are not met, then access is denied as represented by block 158.

If the user's location is known, as represented by the "yes" branch of the decision diamond 156, the security system 20 looks to determine if the user is in a proper location as represented by decision diamond 164. As indicated above, the system 20 uses both the location identifier 118 and location determination rule engine 122 as seen in FIG. 3.

If the user's location is proper, as represented by the "yes" branch of decision diamond 164, the system 20 grants access as represented by block 166. The user's new location is then recorded, as represented by block 118 in FIG. 3 and block 168 in FIG. 4.

If the user's location is not proper, as represented by the "no" branch of decision diamond 164, the system 20 needs to determine if the system 20 is in a training mode as represented by decision diamond 170. While the branch "yes" and the branch "no" both go to the same block, the institute penalty as represented by block 172. However the type of penalty will vary. The penalty could vary from preventing access until the code is overridden, a time delay as represented by block 174, or allowing access but in addition notifying the person as represented by block 176.

After an increased security level has occurred, it may be that it is now necessary to know where all physical access users are at any given time. For example, the alert state may be increased in a government building or military facility that for everyday practicality has a less strict policy with regards to restricting access based on known user location. Personnel tracking may be important for other reasons as well including; emergency response, time and attendance, allocation of building resources (HVAC), etc.

If the training mode is on, as represented by the "yes" branch of the decision diamond, the phase-in of strict APB and/or ATG policies will be much more efficient and effective.

Passback is merely a way of describing how a situation may have occurred but not necessarily the only way of achieving that situation. For example, a user could enter an area legitimately, but then tailgate out of that area. If the user tries to re-enter the area later then he is effectively in a "passback" situation without having physically passed back his credentials. So in this example, a passback situation has arisen from a tailgating action. If the user was to tailgate out of the area but then try to enter a different area, then this would be seen as a tailgate situation. This is why anti-tailgate restrictions effectively encompass anti-passback (no re-entry) strategies.

If user "A" passes their proximity card 76 back to user "B" (pass back) to use at rotary turnstile 58 to access space 138 in FIG. 1, the system 20, depending on the rules, will not allow access for the second user, user "B." In that the location identifier 118 in FIG. 3 would indicate that the user is in the space 138, the decision diamond 164 would follow the "no" branch if the user's card is being used in an attempt to access space 138.

As indicated above, pass back generally occurs with devices like rotary turnstiles, while tailgating is more likely to occur at a door. If user "B" tailgates user "A" to enter one of the labs 100, then when user "B" attempts to exit the system 20 would indicate that the user is not in the proper location.

In conventional systems, there is no effective way to phase-in strict APB and/or ATG policies in a way that allows physical access users to become familiar with a new security regime before the policy is fully implemented. Users who have previously developed bad habits due to less strict protocols may find themselves effectively locked down and unable to access or egress given areas once the APB/ATG policy is put in force. The only way around this is for the User to commit further access misdemeanors, such as additional APB/ATG violations, or for a system administrator to reset the User's location each time an APB/ATG violation occurs.

In addition, contrary to conventional methods like current "timed" APB methods—which begin at the time of the last valid access and may have no bearing on the next access attempt if the set time is expired—the timing functions for training modes begin at the time of the attempted violation. This has the advantage of penalizing each and every violation with a variable time penalty prior to access being granted. As the lockdown is time based, the system requires no external correction for the user's physical location compared to the user's system location. Training mode may be used independently or in conjunction with existing APB/ATG strategies.

The current system would allow both APB and ATG violations. In the case of the existing "timed" modifier, the current system would allow both APB and ATG violations as long as a given (operator settable) time had elapsed from the last valid access. This could be useful in secure environments where the user's location can't always be tracked. For example: if a door requires access validation of a user in one direction (entering an area) but does not require validation on leaving the area (use of a request to exit sensor) then the system has no way of knowing that a given user has left the area and thus no longer maintains an accurate record of that user's location. If full APB/ATG restrictions were in place, then a user would never be allowed through that door again. In order for that user to re-enter the area whilst anti-passback restrictions are in place, the system must effectively "forget" where the user is. This is the case for the use of conventional timed APB/ATG restrictions.

As detailed earlier, "tailgate" and "passback" are situations not necessarily arising from the physical actions of passing back a credential or tailgating another person through a secure access point. The terms merely aid in describing how such a situation might occur. They could easily be described as no re-entry strategy (anti-pass back) or adjacent area only access strategy. The use of video and other sensors in the detection of such violations may enhance some aspects of detection but may be considered excessive, expensive solutions to a problem that may be solved by simple analytics employing existing equipment.

Overrides for high level employees are implemented in current systems and include override of ATB/ATG restrictions. Other factors to consider might include the number of previous infractions by a particular user, and/or whether the user was a new employee.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed:

1. A security system for allowing access to secure areas, the system comprising:

at least one access control device configured to control the flow of items or users in an at least one secure area;

an access control database containing information regarding criteria for allowing access to the at least one secure area; and a control system configured to receive information from the at least one access control device and to compare the information to the access control database to determine if access is to be granted;

the control system configured to modify access if a discrepancy is noted, the control system including a training model configured to modify the access based on operator-based rules and based on the discrepancy to train a user to adhere to access policies.

2. The security system for allowing access to secure areas of claim 1, further comprising a location database configured to track the location of users in the at least one secure area.

3. The security system for allowing access to secure areas of claim 2, wherein the training model is capable of being customized by an operator.

4. The security system for allowing access to secure areas of claim 3, wherein customization is based on the time since the security system was implemented.

5. The security system for allowing access to secure areas of claim 3, wherein the customization is based on the user's start date.

6. The security system for allowing access to secure areas of claim 3, wherein the customization is based on a change in a security level.

7. The security system for allowing access to secure areas of claim 3, wherein the customization is based on a number of previous violations by the user.

8. The security system for allowing access to secure areas of claim 3, wherein the customization includes a penalty for deviating from standards related to access to the at least one secure area.

9. The security system for allowing access to secure areas of claim 8, wherein the penalty is no access to the at least one secure area.

10. The security system for allowing access to secure areas of claim 8, wherein the penalty includes a notification to the operator and the user identifying a violation of the standards related to access to the at least one secure area.

11. The security system for allowing access to secure areas of claim 8, wherein the penalty is delayed access to the at least one secure area.

12. The security system for allowing access to secure areas of claim 11, wherein the delay is based, in part, on the number of days since a change in the security level.

13. The security system for allowing access to secure areas of claim 11, wherein the delay is based, in part, on whether the user is categorized as a new user.

14. A security system for allowing access to secure areas, the system comprising;

at least one access control device configured to control the flow of items or users in at least one secured area;

an access control database containing information regarding criteria for allowing access to the at least one secure area;

a control system configured to receive information from the at least one access control device and to compare the information to the access control database to determine if access is to be granted;

a location database configured to track the location of users in the at least one secure area;

the control system configured to modify access if the user's location is inconsistent with information in the location database; and the control system including a training model configured to modify the access based on operator-based rules and based on detection that the user's location is inconsistent with information in the location database to train a user to adhere to access policies.

15. The security system for allowing access to secure areas of claim 14, where the training model is capable of being customized by the operator and the customization includes a penalty for deviating from the standards related to access to the at least one secure area.

16. The security system for allowing access to the secure areas of claim 15, wherein the customization is based on the time since the security system was implemented.

17. The security system for allowing access to secure areas of claim 15, wherein the customization is based on the user's start date.

18. The security system for allowing access to secure areas of claim 15, wherein the customization is based on a change in a security level.

19. The security system for allowing access to secure areas of claim 15, wherein the penalty is delayed access to the at least one secured area.

20. The security system for allowing access to secure areas of claim 19, wherein the delay is based, in part, on the number of days since a change in the security level.

21. The security system for allowing access to secure areas of claim 19, wherein the delay is based, in part, on whether the user is categorized as a new user.

22. A method of training for an access control system comprising:

providing at least one access control device for controlling the flow of items or users in at least one secure area;

detecting a request to access the at least one secure area by a user;

determining if the user's location is known prior to the access request;

providing a training mode that includes customizable penalties for an access request that has an inconsistency as compared to an access control database containing information regarding criteria for allowing access to the at least one secure area; and determining a penalty for inconsistency based on a level of training of the user to train the user.

23. The method of training for an access control system of claim 22, wherein the penalty is for deviating from the standards related to access to the at least one secure area.

24. The method of training for an access control system of claim 22, wherein the penalty is no access to the at least one secure area.

25. The method of training for an access control system of claim 22, wherein the penalty includes notification to an operator and user identifying a violation of the standards related to access to the at least one secure area.

26. The method of training for an access control system of claim 22, wherein the penalty is delayed access to the at least one secure area.

27. The method of training for an access control system of claim 22, wherein the customization is configured to be performed by the operator.

28. The method of training for an access control system of claim 27, wherein the customization is based, in part, on the time since the security system was implemented.

29. The method of training for an access control system of claim 27, wherein the customization is based, in part, on the user's start date.

30. The method of training for an access control system of claim 27, wherein the customization is based, in part, on a change in a secuty level.

* * * * *